United States Patent [19]
Reed et al.

[11] 3,917,797
[45] Nov. 4, 1975

[54] REMOVAL OF CONTAMINANTS FROM GASEOUS STREAMS

[75] Inventors: Richard S. Reed, Millington; Alan R. Glueck, Lawrenceville, both of N.J.

[73] Assignee: Catalox Corporation, Millington, N.J.

[22] Filed: May 8, 1974

[21] Appl. No.: 467,938

[52] U.S. Cl. ............. 423/210.5; 423/220; 423/242; 423/535
[51] Int. Cl.² ........................................ B01D 53/34
[58] Field of Search ......... 423/210.5, 242, 220, 535

[56] References Cited
UNITED STATES PATENTS
3,855,386  12/1974  Moore .............................. 423/244

FOREIGN PATENTS OR APPLICATIONS
1,136,903  12/1968  United Kingdom ................. 423/535

*Primary Examiner*—Earl C. Thomas
*Attorney, Agent, or Firm*—George E. Kersey

[57] ABSTRACT

Method and apparatus for the continuous removal of contaminants, such as sulfur containing compounds, from a gaseous stream, such as stack gas, by the passage of a liquid salt through the stream.

12 Claims, 4 Drawing Figures

REMOVAL OF CONTAMINANTS FROM GASEOUS STREAMS

BACKGROUND

This invention relates to the removal of contaminants from gaseous streams, and, more particularly to the removal of sulfur containing compounds from such streams.

Sulfurous contaminants in gaseous streams are often directly present as sulfur dioxide, or are convertible to sulfur dioxide.

For example, the combustion of fuels with a relatively high sulfur content produces an exhaust emission with an objectionable sulfur dioxide content. In addition, many chemical processes produce waste gases with such sulfurous contaminants as carbon disulfide and hydrogen sulfide.

The conversion of carbon disulfide, hydrogen sulfide, and the like to sulfur dioxide is easily accomplished. The sulfur dioxide can then be catalytically converted to sulfur trioxide, which is, in turn, converted to sulfuric acid.

In the process disclosed in U.S. Pat. No. 3,119,663, which issued Jan. 28, 1964 to H. Furkert, carbon disulfide and hydrogen sulfide are converted to sulfur trioxide using vanadium catalyst of the kind conventionally used for the oxidation of sulfur dioxide to sulfur trioxide. This technique is accompanied by processing and equipment complexities, but suitable vanadium catalysts are widely known. In the typical case they consist of compounds of vanadium and potassium on an inert carrier, as illustratively disclosed in U.S. Pat. No. 3,226,338, which issued to H. L. Riley et al on Dec. 28, 1965. Other illustrative catalysts are disclosed in U.S. Pat. No. 2,799,560, which issued to P. Davies on July 16, 1957; U.S. Pat. No. 2,418,851, which issued to E. F. Rosenblatt on Apr. 15, 1947; U.S. Pat. No. 1,862,825, which issued to N. A. Laury on June 14, 1932; U.S. Pat. No. 1,696,546, which issued to A. O. Jaeger et al. on Dec. 25, 1928; etcc.

Supported catalysts of the foregoing type are in wide use and have been used, for example, in the removal of sulfur dioxide from flue gas as shown in U.S. Pat. No. 3,615,196, which issued to A. B. Welty, Jr., et al. on Oct. 26, 1971. Among the objections to the Welty technique are that it requires a mechanically complex, rotating reactor in which the catalyst is supported, and it makes use of an air stream that is heated above the temperature of the stack gases.

Non-supported catalysts have also been used in converting sulfur dioxide to sulfur trioxide, as disclosed in U.S. Pat. No. 2,381,908 which issued to D. M. Hurt et al. on Aug. 14, 1945 and British Pat. Nos. 1,136,903 and 1,244,978 which issued to C. N. Kenney et al on Dec. 18, 1968 and Sept. 2, 1971. These techniques are suitable for the production of sulfur trioxide and sulfuric acid, but they are not suitable for the removal of contaminants from gaseous streams, since only a portion of the sulfur dioxide in the exhaust stream is converted.

Accordingly, it is an object of the invention to facilitate the removal of sulfurous contaminants from gaseous streams. A related object is to simplify the proecedure and equipment used for so doing.

Another object is to eliminate the need for a supported catalyst in the removal of sulfurous contaminants from gaseous streams. A related object is to achieve the substantial removal of such contaminants, even when present in low considerations, without the need for a supported catalyst.

A further object is to achieve the removal of a substantial portion of the sulfur dioxide resulting from the combustion of fuels containing a relatively high percentage of sulfur. A related object is to achieve the removal of 90 percent of the sulfur dioxide resulting from the combustion of fuel with more than 1 percent sulfur.

SUMMARY OF THE INVENTION

In accomplishing the foregoing and related objects, the invention provides for continuously passing a liquid vanadium salt through an outgoing gaseous stream to selectively absorb sulfurous contaminants. After absorbing the containiminants, the salt then flows to location away from the gaseous stream, where the contaminants are desorbed in converted form for further processing.

As a result the level of contaminants in the outgoing gaseous stream can be reduced to an acceptable level and the contaminants are convertible to a useful form.

In particular the molten salt is desirably a mixture of vanadium oxide and an alkali metal compound, such as potassium pyrosulfate. This molten mixture is introduced into an absorber unit at a temperature in the approximate range from 500° to 700°F, where it flows in contact with the contaminated gaseous stream and absorbs the sulfurous contaminants. The molten mixture with the absorbed contaminants then flows out of the absorber and is raised in temperature to permit the conversion of absorbed compound to sulfur trioxide.

The temperature increase is generally on the order of 100°F, but it may be higher short of the temperature where there is dissociation of the resulting sulfur trioxide. When the molten mixture has been elevated to a suitable temperature, it flows into a desorber, into which an oxidizing stream is injected to restore the mixture to its original oxidation state and serve as a carrier for the resulting sulfur trioxide, which is readily converted into sulfuric acid.

In one embodiment of the invention the molten salt or melt is 14 percent by weight vanadium pentoxide and 86 percent by weight potassium pyrosulfate. When used to convert sulfur dioxide in flue gase or hydrogen sulfide from a gasifier to sulfur trioxide the melt is injected into the absorber at a temperature in the range between 550° and 600°F and is raised in temperature to the range between 650° and 700°F before being applied to a desorber.

In accordance with one aspect of the invention, the heat used to raise the temperature of the melt is obtained, after start-up, from the flue gas, so that no external source of heating is required.

In accordance with another aspect of the invention, various filters and precipitators are used to remove ash from the melt.

DESCRIPTION OF THE DRAWINGS

Other aspects of the invention will become apparent after considering several illustrative embodiments taken in conjunction with the drawings, in which.

DETAILED DESCRIPTION

Figure 1:
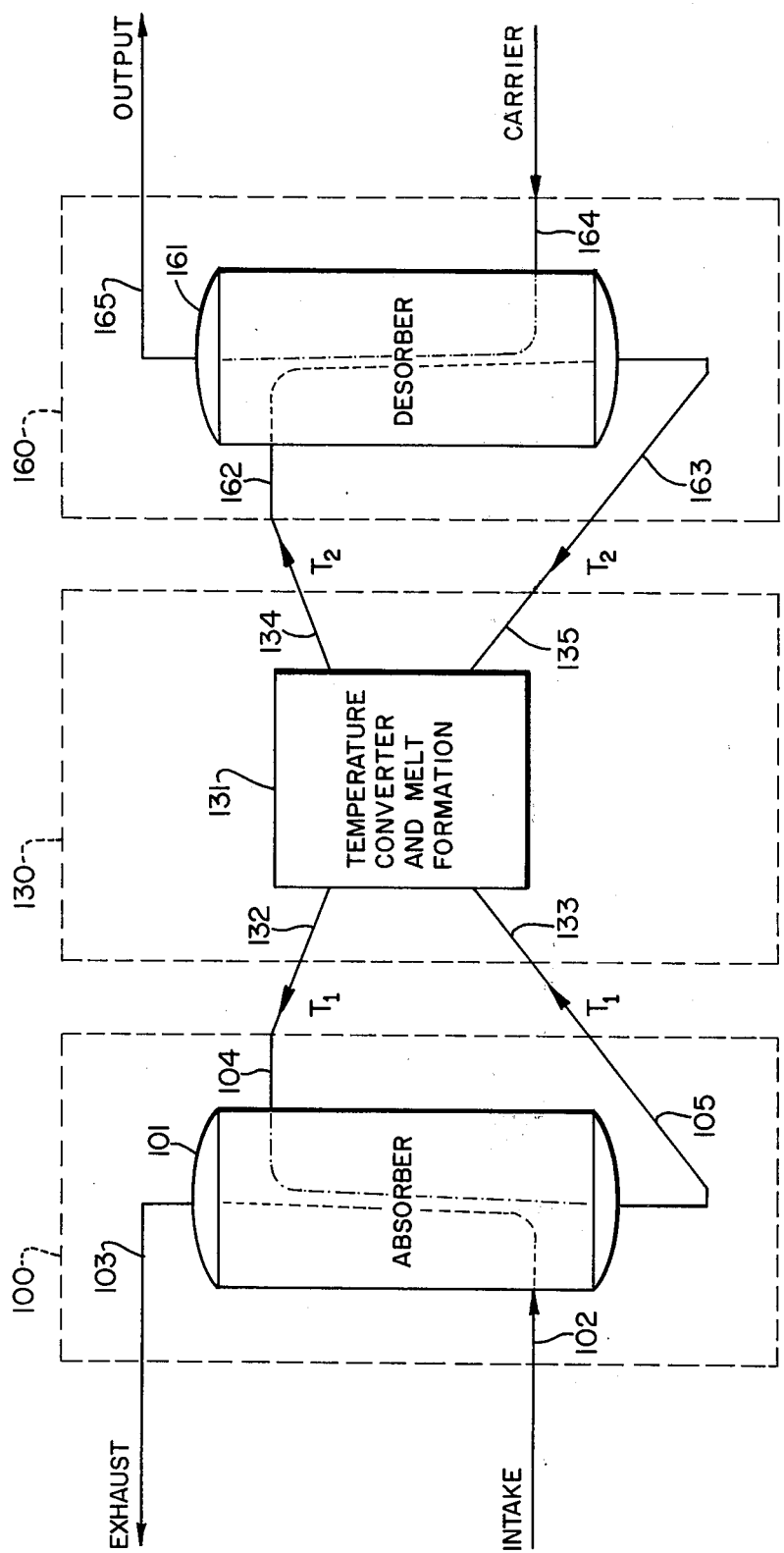
FIG. 1 is a simplified diagrammatic flow sheet in accordance with the invention.

Turning to the drawings, in the simplified diagrammatic representaton of FIG. 1, the absorption of contaminants and their desorption in converted form is shown in three sections 100, 130 and 160.

In the first section 100, an incoming gaseous stream with sulfurous contaminants flows through an absorber 101, entering through an intake 102 and leaving through an exhaust 103. The intake is typically flue gas from a boiler or an output from a chemical processor, such as a gasifier.

While the gaseous stream is flowing through the absorber 101, a molten salt or melt passes through the absorber in the opposite direction, entering at an inlet 104 and leaving at an outlet 105.

The melt is prepared and stored in the second section 130 in a temperature converter unit 131 and is pumped to the absorber 101 over a line 132 at a temperature $T_1$. After passage through the absorber 101 the melt is collected and passed over a line 133 to the converter 131 where it is elevated to a temperature $T_2$ that is greater than the temperature $T_1$.

The elevated temperature melt is then passed over a line 134 to the third section 160 at the inlet 160 of a desorber 161. The melt passes through the desorber 161 to an outlet 163 and is returned to the converter 131 over a line 135. Thus, the melt is continually circulated through the absorber 101 and the desorber 161 through the converter 131 where there are two changes in temperature (from $T_1$ to $T_2$ and from $T_2$ back to $T_1$) during each cycle.

At the desorber 161 a carrier stream is applied at an inlet 164, passing in contact with the melt that simultaneously flows from the inlet 162 to the outlet 163, and flowing out at the outlet 165. The carrier restores the melt to its original oxidation state and strips the converted sulfur trioxide from the melt and allows it to be applied, for example, to a conventional plant for the manufacture of sulfuric acid.

The melt used in the process illustrated by FIG. 1 is advantageously a complex of vanadium and potassium compounds, for example vanadium pentoxide and potassium sulfates, including potassium pyrosulfate. The sulfates are believed to form a vanadium complex which reacts with sulfur dioxide, for example, in accordance with equation (1).

$$SO_2 + V_2O_5 \cdot SO_3 \rightarrow 2VOSO_4 \tag{1}$$

This is believed to be the mechanism by which sulfur dioxide is absorbed by the melt in the absorber 101. Upon being heated, it is believed that sulfur trioxide is able to become dissociated as set forth in equation (2).

$$2VOSO_4 \rightarrow V_2SO_4 \cdot SO_3 + SO_3 \tag{2}$$

The carrier stream applied to the desorber 161 then carries away the sulfur trioxide of equation (2) and restores the melt in accordance with equation (3).

$$V_2O_4 \cdot SO_3 + \tfrac{1}{2} O_2 \rightarrow V_2O_5 \cdot SO_3$$

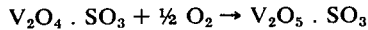

(3)

In a laboratory test, the melt was prepared from a mixture containing 14 percent vanadium pentoxide and 86 percent potassium pyrosulfate. The mixture became molten at approximately 500°F and was sufficiently fluid at 560°F for experimental operation. A gaseous stream with a concentration of 2.50 percent sulfur dioxide was brought into contact with the melt, which absorbed 2.42 percent, or over 95 per cent, of the sulfur dioxide, which was subsequently recovered as sulfur trioxide.

Figure 2:
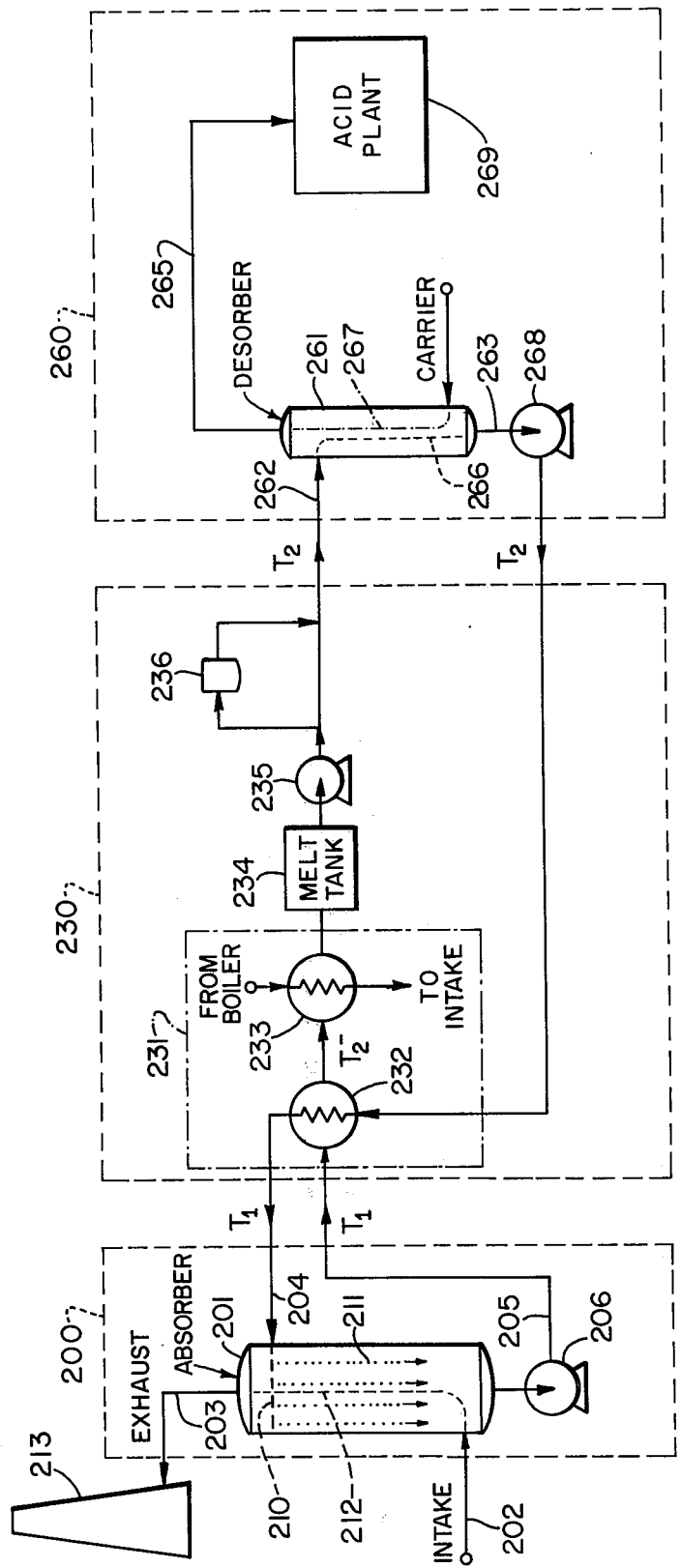
FIG. 2 is a diagrammatic flow sheet for the conversion of sulfur dioxide contaminants to sulfuric acid in accordance with the invention.

A more detailed representation of the invention is shown in FIG. 2. Flue gas from a boiler is applied to an absorber 201 in the first section 200 of the system by an intake line 202. Where desirable, the intake may include mechanical and electrostatic precipitators for the preliminary removal of fly ash. A melt for absorbing sulfurous contaminants, such as sulfur dioxide in the gas is simultaneously applied to the absorber at an inlet 204 by, for example, a spray head 210 which produces droplets 211 of molten salt, that contact the rising flue gas 212, absorbing sulfur dioxide, and are collected at the bottom of the absorber 201.

The residual flue gas from which the sulfur dioxide has been absorbed passes to a stack 213 by way of an exhaust line 203. The line 203 may include a preheater (not shown) to serve as an exchanger for extracting some of the heat of the exhaust gas and using it to heat the air used for combustion.

In addition the absorber 201 may include a demister (not shown) at the input to the exhaust line 203 to prevent droplets of the melt from being carried upwardly out of the absorber.

The melt which collects at the bottom of the absorber 201 is acted upon by a pump 206 which forces it through a line 205 to a converter 231 of the second section 230 of the system.

The first unit in the converter 231 is a heat exchanger 232 by which the circulating melt is raised from the absorber temperature $T_1$ to the approximate temperature $T_2$ at which the melt enters the desorber 261. Since the circulation of the melt between the absorber 231 and the desorber 261 invariably involves some heat loss, the melt is raised to the desired temperature $T_2$ by a second heat exchange 233. The later exchanger 233 advantageously extracts heat from the intake line 202 from the boiler.

The melt then goes to a holding and make-up take 234 the purpose of which is to allow completion of the conversion of the absorbed sulfur dioxide to sulfur trioxide at the elevated temperature $T_2$. The tank 234 also advantageously includes a heater for starting the process by firing the melt to the starting temperature. It is desirable to start the converter before the initiation of combustion so that there will not be any preliminary exhaust emission laden with sulfurous contaminants.

From the tank 234, a pump 235 forces the melt to the third portion 260 of the system. A portion of the melt is diverted to a filter 236 that removes any ash that accumulates in the melt. The output of the filter 236 joins with the direct flow to the input line 262 of the desorber 261.

In the desorber 261, the melt 266 with the sulfur trioxide converted after the absorption flows across a series of sieve trays. An oxidizing agent, for example, an air stream 267 is applied at the input line. The stream 267 strips the sulfur trioxide from the downwardly flowing melt 266 and restores it to its original oxidation state.

A pump 268 connected to a line 263 returns the restored melt to the heat exchanger 232 where heat is transferred to the melt being pumped along the line 205. The carrier stream 267 laden with sulfur trioxide is through a line 265 applied to a conventional acid plant 269.

In using the system of FIG. 2 in the purification of flue gas from a 300 megawatt power generator, it is expected that the absorber 201 will be operated at a temperature of 550°F and gas will be applied at the intake 202 at a rate of 957,000 cubic feet per minute. The associated diameter of the absorber will be 32 feet. If the coal that is burned has a 4 per cent sulfur content, the sulfur dioxide in the gas entering the absorber will be 3,000 parts per million, which will be reduced to below 150 parts per million for gas leaving the absorber.

The melt will have a specific gravity of 2.0 in an amount of 20 pounds for each 1000 standard cubic feet of gas. It is anticipated that 99.5 percent of the fly ash will be removed by electrostatic precipitation. The remaining 0.5 percent is absorbed by the melt and is removed by the filter 236. However, it has been determined experimentally that a fly ash loading of 25 per cent does not interfere with its functioning. Assuming that the burning of the coal produces approximately 18,000 pounds of sulfur trioxide per hour, an appropriate diameter for the desorber 261 is approximately 6 feet.

The melt enters and leaves the absorber 201 at a temperature of about 550°F. At the exchanger 232 the temperature is raised slightly less than 100°F. The final melt temperature of about 650°F is achieved by heat from the exchanger 233.

Figure 3:
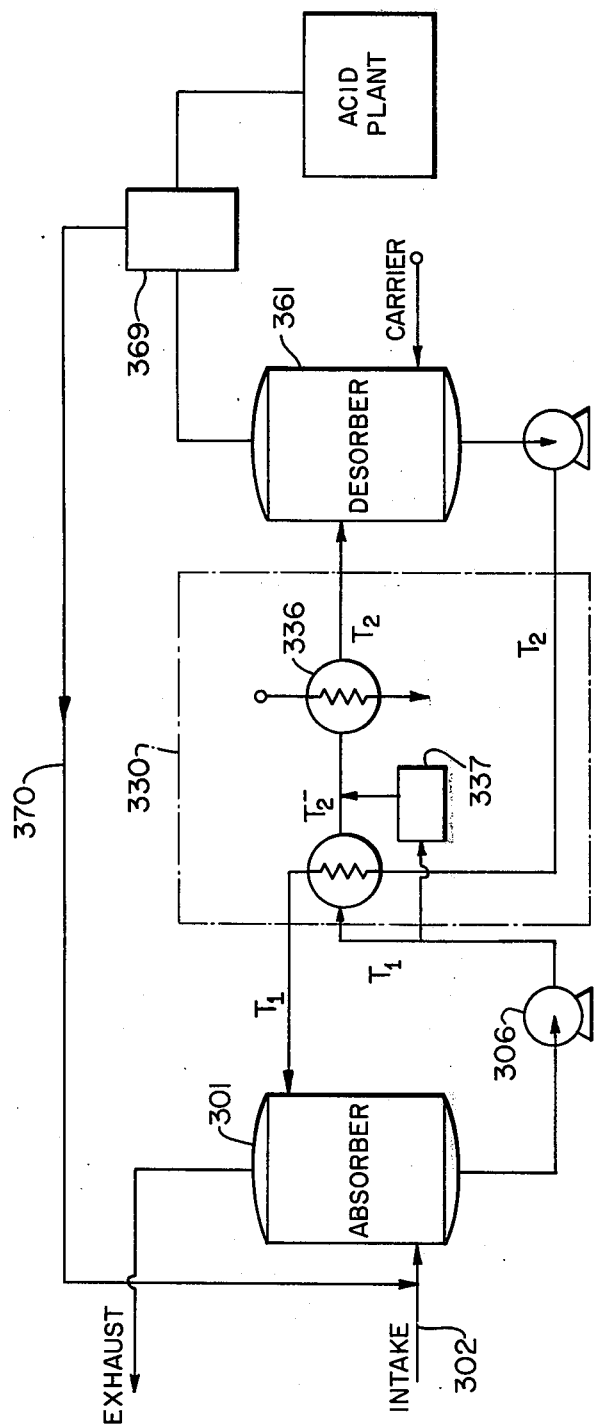
FIG. 3 is a diagrammatic flow sheet for the large scale conversion of sulfur dioxide contaminants to sulfuric acid in accordance with the invention.

A fruther embodiment of the invention is shown in FIG. 3. The flue gas entering the absorber 301 at the intake 302 can be cooled to an appropriate level, e.g. 600°F, by passage through an air preheater (for the combustion gas). The remainder of the system is similar to that of FIG. 2, except that the desorber 361 is operated at correspondingly increased temperature level, e.g. 700°F.

In the embodiment of FIG. 3 the fly ash filter 337 in the unit 330 is supplied by pump 306 in advance of the heat exchanger 336 and the output of the desorber 361 is to an acid absorber 369 which is vented by a line 370 to return any unconverted sulfur dioxide to the absorber 301.

Figure 4:
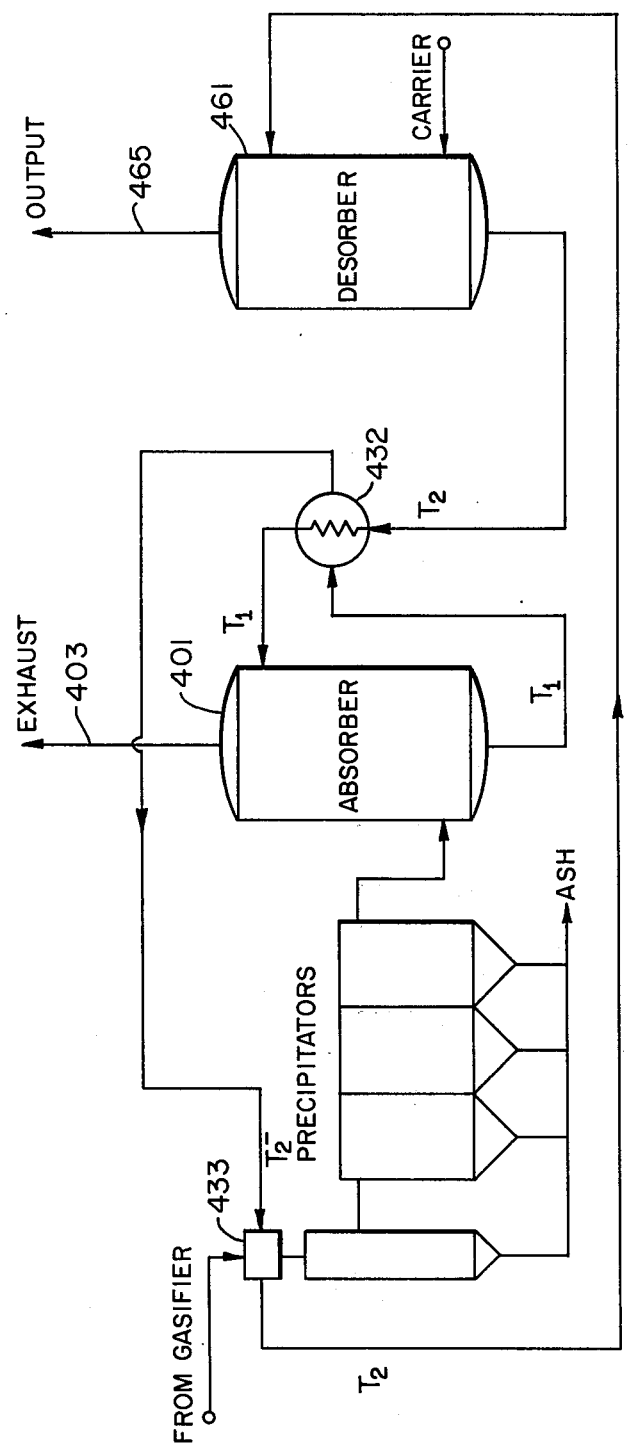
FIG. 4 is a diagrammatic flow sheet for the conversion of hydrogen sulfide to sulfuric acid in accordance with the invention.

Another embodiment of the invention is shown in FIG. 4 for the removal of hydrogen sulfide from the output of a gasifier operation.

The gaseous output from a set of precipitators is applied to an absorber 401. The gaseous stream includes hydrogen sulfide and carbon dioxide from the gasification of coal.

A melt of the kind discussed previously at a temperature of about 600°F enters the absorber 401, absorbs hydrogen sulfide, but not carbon dioxide and is passed through a set of heat exchangers 432 and 433 and to a desorber 461. The output of the desorber over line 465 is handled in the manner described previously. The exhaust output of the absorber 401 over line 403 is treated in convention fashion to recover carbon dioxide and a mixture of hydrogen and carbon monoxide (for use in the manufacture of methanol).

While various aspects of the invention have been illustrated by the foregoing detailed embodiments, it will be understood that various substitutions of equivalents may be made without departing from the spirit and scope of the invention as set forth in the appended claims:

What is claimed is:

1. The method of removing sulfur dioxide from a mixture of gases comprising the steps of:
   a. Passing the mixture of gases through an absorber;
   b. Contacting the mixture of gases with a molten salt complex of vanadium oxide and alkali metal compound in said absorber at a temperature in the range from about 500° to about 700°F.;
   c. Removing the molten salt from said absorber and elevating the temperature of the salt by about 100°F.;
   d. Separating sulfur trioxide from the molten salt with a gaseous stream.

2. The method as defined in claim 1 wherein said molten salt includes potassium pyrosulfate.

3. The method as defined in claim 1 wherein said molten salt is initially constituted of 14 percent by weight vanadium pentoxide and 86 percent by weight potassium pyrosulfate.

4. The method as defined in claim 1 wherein the molten salt removed from the absorber is raised in temperature to a level below which the sulfur trioxide becomes dissociated from said salt.

5. The method as defined in claim 1 wherein the gaseous stream oxidizes the molten salt to restore it to its original oxidation state.

6. The method as defined in claim 5 wherein the gaseous stream is air.

7. The method as defined in claim 1 wherein the temperature of the molten salt is in the range from 550° to 600°F.

8. The method as defined in claim 1 wherein the molten salt is heated in an exchanger by the mixture of gases.

9. The method as defined in claim 1 wherein the mixture of gases is cooled before being passed through said absorber.

10. The method as defined in claim 1 wherein the said molten salt is sprayed into said absorber.

11. The method as defined in claim 1 wherein the separated sulfur trioxide is converted to sulfuric acid.

12. The method as defined in claim 1 wherein fly ash is filtered from said molten salt after it is removed from said absorber.

\* \* \* \* \*